Figure 2:
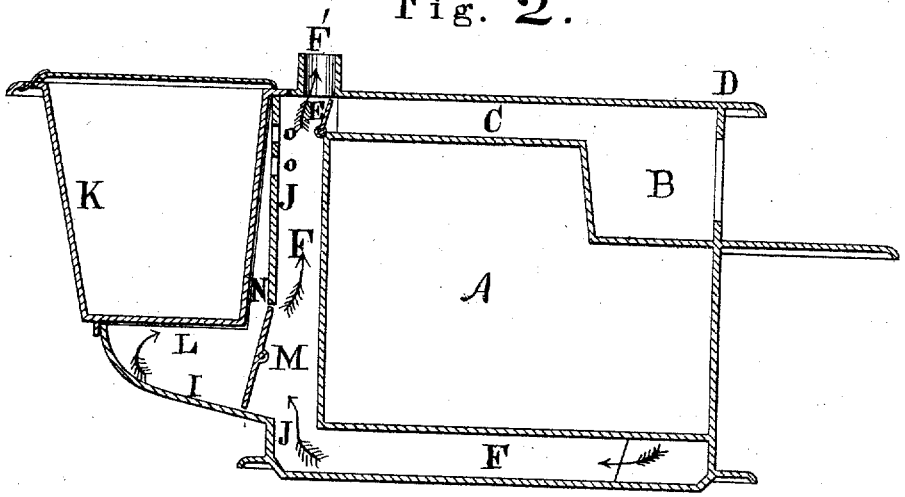

2 Sheets--Sheet 1.

D. E. PARIS.
Cooking-Stoves.

No. 5,995.

Reissued Aug. 4, 1874.

Witnesses,
N. Davenport.
L. H. Stone.

Inventor,
Joseph B. McKinstry
Assignee of Daniel E. Paris

THE GRAPHIC CO. PHOTO-LITH. 39 & 41 PARK PLACE, N.Y.

D. E. PARIS.
Cooking-Stoves.

No. 5,995. Reissued Aug. 4, 1874.

Witnesses.
N. Daumont
L. H. Stone.

Inventor.
Joseph Mc Vinston
assignee of Daniel E. Paris

THE GRAPHIC CO. PHOTO-LITH. 39 & 41 PARK PLACE, N.Y.

UNITED STATES PATENT OFFICE.

DANIEL E. PARIS, OF TROY, NEW YORK, ASSIGNOR, BY MESNE ASSIGNMENTS, TO JOSEPH B. WILKINSON.

IMPROVEMENT IN COOKING-STOVES.

Specification forming part of Letters Patent No. 67,670, dated August 13, 1867; reissue No. 5,995, dated August 4, 1874; application filed February 10, 1874.

*To all whom it may concern:*

Be it known that DANIEL E. PARIS, of Troy, county of Rensselaer and State of New York, invented an Improvement in Cooking-Stoves, of which the following is a specification:

The invention that forms the subject of this patent relates to that class of cook-stoves known to the trade as the common square low-oven diving-flue cook-stove, with the fire-box and pipe-collar at opposite ends, in which the oven is heated by currents of hot air, or the heated products of combustion first passing from the fire-box over the oven in one broad sheet, thence traversing the back plate and the bottom thereof, said stove being provided with a hot-air chamber formed by the combination of a casing and reservoir behind the descending and ascending vertical rear flues.

The general features of the invention consists in dividing the reservoir hot-air chamber into compartments by means of flue-strips, to form a good and sufficient support for a water-reservoir, resting upon, or supported by, such flue-strips or flanges dividing the reservoir-chamber. It further consists in extending the partition, or what is known to the trade as flue-strips, in the ordinary rear vertical flues back and beyond the line of the ordinary back plate into a reservoir-chamber. It also consists in arranging a damper between such flue-strips in the middle chamber, under a reservoir, so as to exclude the hot air on its passage from under the oven, and up the ascending flue to the pipe-collar. It also consists in extending back against the front or inner side, and under a reservoir, flue-strips on a parallel vertical line of the partition-strips, in the usual vertical flue-space, for the purpose of forming a hot-air chamber between the front wall of the reservoir and so much of the back plate remaining between the vertical flues and said hot-air chamber, in which hot-air chamber is constructed a rolling damper to control the aperture in the vertical end plate at or near the bottom of the hot-air or return-flue chamber.

Prior to this invention various methods had been devised of constructing and arranging water-reservoirs upon the exterior of cook-stoves, both above and below the top plate, which thus, in addition to, and without interferring with their ordinary use for cooking purposes, could be made to furnish a constant supply of heated water for various domestic uses; but all these prior constructions, although some of them were valuable improvements in the manufacture, were more or less imperfect in certain particulars, which imperfections it is the object of the present invention to remedy.

When, for instance, the attached reservoir was of the "low-down" order—*i. e.*, was placed either entirely or largely below the plane of the top plate of the stove, whether cased or not—no means existed whereby the hot air or products of combustion could be excluded from one part of the bottom of a reservoir, or the front or inner side next adjoining the ascending flue, and still the working of the stove for baking purposes and heating the reservoir go on. This is a valuable improvement to be able to control the heating of the reservoir, and not interfere with the other uses of the stove. Heretofore reservoirs have been suspended within a casing or supported on the outer edge of the bottom. Both ways have been found imperfect in allowing the whole bottom to be exposed to a high temperature of heat without proper rests or supports under the same.

The plan of arranging flanges or flue-strips under a reservoir that serve a twofold purpose, viz., dividing the hot-air chamber, and at the same time supporting or sustaining a reservoir under the bottom in two horizontal lines, or lines curved to conform to the shape of the reservoir, thus enabling the manufacturer to make the reservoir of much thiner metal than heretofore, and prevent the sagging of the bottom when filled with water, is unquestionably a great improvement over any other known plan.

Figure 1:
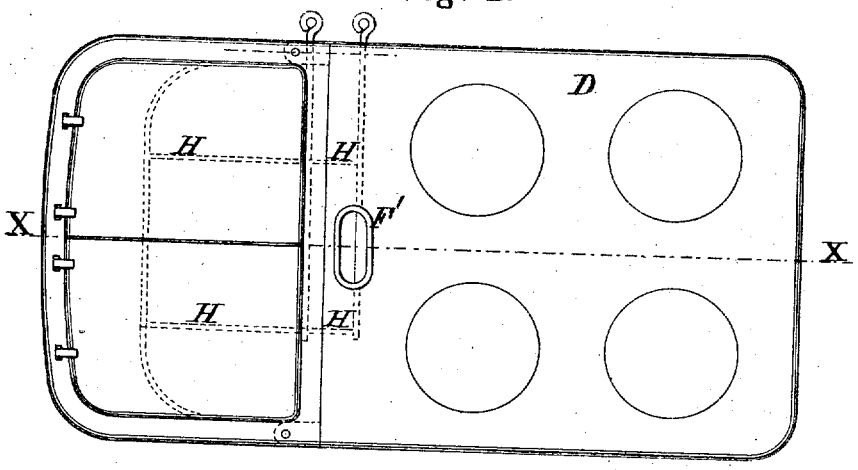
Figure 4:
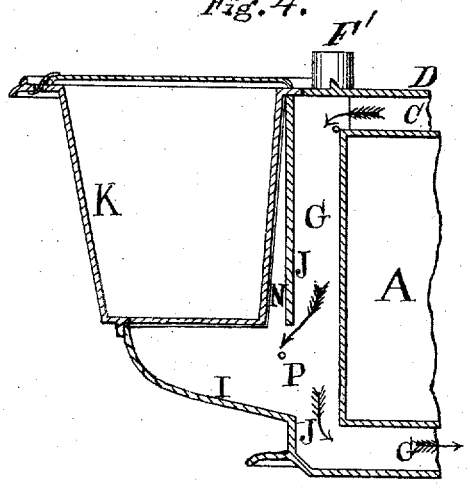
Figure 5:
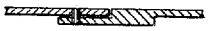
Figure 6:
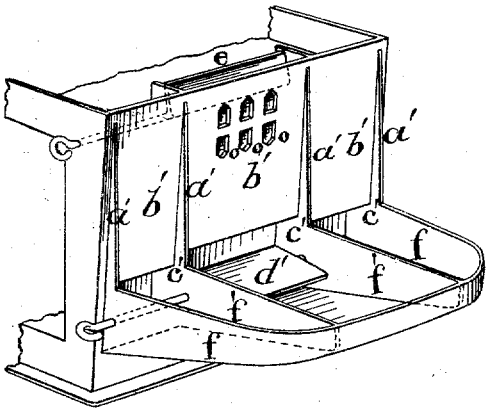
Figure 3:
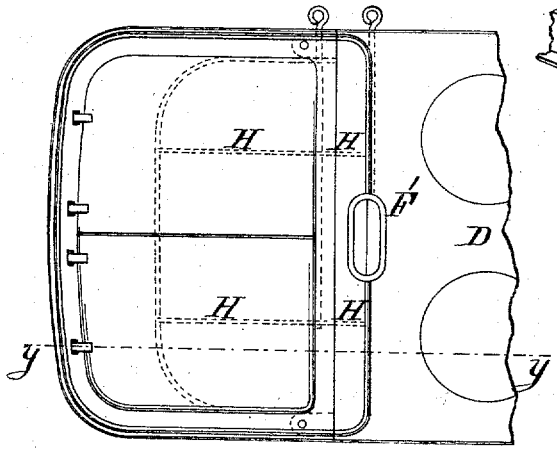

Referring to the drawings hereto attached, (in two plates, viz., Plate I and Plate II,) Figures 1, 2, 3, 4, and 6 represent a diving-flue cooking-stove provided with a water-reservoir, and a hot-air chamber located upon the exterior of the rear vertical wall, and above the plane of the lower oven-plate, and behind the pipe-collar. Fig. 1 is a plan view of the stove, with dotted lines showing the situation of the hot-air chamber with flue-strips and dampers. Fig. 2 is a central longitudinal vertical section of the stove through line *x* of Fig. 1. Fig. 3 is a plan view of the rear part of the stove, showing the covers and top rim of the reservoir lapping over onto the top plate and inclosing the top of the hot-air chamber, shown by dotted lines, as is also the flue strips and spindles of the dampers. Fig. 4 is a longitudinal vertical section of the stove through line *y* of Fig. 3. Fig. 5 shows a plan of uniting the reservoir to the top plate. Fig. 6 is a perspective view of the rear part of the stove, with the reservoir and top plate removed, showing the hot-air chamber or return-flue space and back plate in connection with the aperture-damper and flue-strips.

Similar letters of reference indicate like parts.

In the figures, A is the oven; B, the fire-box; C, the top flue; D, the top plate; K, the reservoir; L, the hot-air chamber under the reservoir; N, the hot-air chamber between the reservoir and back vertical plate; F, the middle ascending flue under the bottom and between the oven and rear vertical plate to the pipe-collar; J, the rear vertical plate; M, the damper in Fig. 2, and I the bottom plate of the hot-air chamber under the reservoir; F′, the pipe-collar; G, the descending corner-flues; P, the aperture through the rear vertical plate from the corner-flues into a section of the hot-air chamber. O O are apertures through the vertical end plates. H H, in Figs. 1 and 3, show the location of the flue-strips as extended. *d′*, as in Fig. 6, is the damper; *f′*, the partition strips or flanges; *b′*, the back vertical plate remaining, not cut away or omitted; *f*, a hot-air chamber under a reservoir; *a′*, the division or flue strips between the back vertical plate and a reservoir; *e*, the ordinary damper of a diving-flue stove in front of the pipe-collar.

The arrows indicate the currents of draft.

Using the letters shown in Fig. 6, the operation of this improved water-reservoir cooking-stove is as follows: When the damper *e* is thrown forward the caloric will pass along the top sheet-flue and out at the exit-pipe, thus securing a direct draft. When the dampers *e* and *d′* are closed the products of combustion will plunge down the corner-flues, more or less expanding underneath, and up the front side of those portions of the reservoir on the outer sides of the flue-strips *c′* and *f′*; thence along the bottom of the oven until they meet at its farther end, when the united currents will return along under the middle portion of the oven, and thence up the middle ascending flue to the exit-passage. When the damper *d′* is opened the heated currents will take the same course just described until they reach the aperture controlled by this damper, when part will pass directly to the exit-pipe, and a portion will expand into the hot-air chamber underneath, and up the front wall of that portion of the reservoir in the middle compartment formed by the flue-strips *c′* and *f′*, and finally escape to the exit-passage through the apertures O O, &c.

From the foregoing description it will be understood that the invention in question relates more particularly to an improved method of heating a reservoir by the division of a hot-air chamber with partition or flue strips to sustain a reservoir and preserve the system of draft in the stove as usually made without the reservoir attachment.

What is hereby claimed is—

1. Partition-strips in a hot-air chamber, back of the ordinary rear vertical flues and behind the pipe-collar of a cooking-stove, upon which to support a water-reservoir.

2. The extended usual partition or flue strips in the rear vertical flues, back and beyond the line of the ordinary vertical plate of a cooking-stove, in part cut away or omitted, in combination with a water-reservoir located back of such line of the ordinary vertical plate.

3. The combination of the following elements: First, a hot-air chamber, contiguous to and embracing some portion of a water-reservoir located exterior to the walls that inclose the ordinary rear-flue space of a cooking-stove; second, partition-strips in such hot-air chamber and under a water-reservoir; third, an opening or aperture communicating between such reservoir-chamber and such flue-space, and provided with a damper for opening or closing it at pleasure.

4. A hot-air chamber between the back plate of the stove and the front side of the reservoir, in combination with flue-strips in said chamber and a rolling damper between the flue-strips, for the purpose described and set forth.

JOSEPH B. WILKINSON,
*Assignee of Daniel E. Paris.*

In presence of—
WILLIAM BROWN HARDY,
ALMADUS WILKINSON.